(12) United States Patent
Wang et al.

(10) Patent No.: US 10,983,718 B2
(45) Date of Patent: Apr. 20, 2021

(54) METHOD, DEVICE AND COMPUTER PROGRAM PRODUCT FOR DATA BACKUP

(71) Applicant: EMC IP Holding Company LLC, Hopkinton, MA (US)

(72) Inventors: Yi Wang, Chengdu (CN); Qingxiao Zheng, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 142 days.

(21) Appl. No.: 16/285,200

(22) Filed: Feb. 26, 2019

(65) Prior Publication Data

US 2020/0133558 A1    Apr. 30, 2020

(30) Foreign Application Priority Data

Oct. 26, 2018  (CN) .......................... 201811261810.7

(51) Int. Cl.
*G06F 3/06*    (2006.01)

(52) U.S. Cl.
CPC ............ *G06F 3/0647* (2013.01); *G06F 3/067* (2013.01); *G06F 3/0619* (2013.01); *G06F 3/0643* (2013.01)

(58) Field of Classification Search
CPC ...... G06F 3/0613; G06F 3/0619; G06F 3/064; G06F 3/0643; G06F 3/0647; G06F 3/065; G06F 3/067
USPC .................................................. 711/162, 165
See application file for complete search history.

(56) References Cited

U.S. PATENT DOCUMENTS

| | | | |
|---|---|---|---|
| 2011/0153965 A1* | 6/2011 | Haustein ................. | G06F 3/065 711/162 |
| 2013/0111171 A1* | 5/2013 | Hirezaki ................. | G06F 3/064 711/165 |
| 2014/0108752 A1* | 4/2014 | Brown ................... | G06F 3/0619 711/162 |
| 2015/0370505 A1* | 12/2015 | Shuma ................... | G06F 3/0604 711/165 |

* cited by examiner

*Primary Examiner* — Gary J Portka
(74) *Attorney, Agent, or Firm* — Womble Bond Dickinson (US) LLP

(57) ABSTRACT

Embodiments of the present disclosure relate to method, device and computer program product for data backup. In accordance with embodiments of the present disclosure, if a file is migrated between a first machine and a second machine, a data migration module compares the file with files already stored in the second machine, so as to only migrate modified and/or added data chunks in the files to the second machine. In this way, the performance of data migration has been improved.

18 Claims, 9 Drawing Sheets

METHOD, DEVICE AND COMPUTER PROGRAM PRODUCT FOR DATA BACKUP

CROSS-REFERENCE TO RELATED APPLICATION

This patent application claims priority, under 35 U.S.C. § 119, of Chinese Patent Application No. 201811261810.7, filed Oct. 26, 2018, entitled "METHOD, DEVICE AND COMPUTER PROGRAM PRODUCT FOR DATA BACKUP."

FIELD

Embodiments of the present disclosure generally relate to storage management, and more specifically, to methods, devices and computer program products for data backup.

BACKGROUND

In current storage systems, data is usually moved from an old backup system to a new backup system, such that users can keep all old backup data in the new backup system and retire the old backup system. Different backup systems have different structures of backup data, so it is often required to rehydrate and dump all backup data in the memory and send these data to a new backup system.

SUMMARY

In general, embodiments of the present disclosure provide methods, devices and computer program products for data backup.

In accordance with a first aspect of the present disclosure, there is provided a computer implemented method. The method comprises: receiving a request to migrate a file from a first machine to a second machine, the file comprising a plurality of data chunks; determining, for a first data chunk of the plurality of data chunks, whether an identification of the first data chunk has been included in metadata associated with the migration, the metadata indicating information of a data chunk which has been previously migrated from the first machine to the second machine; and controlling migration of the plurality of data chunks based on the determination.

In accordance with a second aspect of the present disclosure, there is provided an electronic device. The device includes at least one processing unit and at least one memory coupled to the at least processing unit and storing machine-executable instructions, the instructions, when implemented by the at least one processing unit. The instructions, when executed by the at least one processing unit, cause the device to perform acts comprising: receiving a request to migrating a file from a first machine to a second machine, the file comprising a plurality of data chunks; determining, for a first data chunk of the plurality of data chunks, whether an identification of the first data chunk has been included in metadata associated with the migration, the metadata indicating information of a data chunk which has been previously migrated from the first machine to the second machine; controlling migration of the plurality of data chunks based on the determination.

In accordance with a third aspect of the present disclosure, there is provided a computer program product. The computer program product is tangibly stored on a non-transitory computer-readable medium and includes machine-executable instructions, the machine-executable instructions, when executed, causing a machine to: receive a request to migrate a file from a first machine to a second machine, the file comprising a plurality of data chunks; determine, for a first data chunk of the plurality of data chunks, whether an identification of the first data chunk has been included in metadata associated with the migration, the metadata indicating information of a data chunk which has been previously migrated from the first machine to the second machine; and control migration of the plurality of data chunk based on the determination.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION OF EMBODIMENTS

Example embodiments of the present disclosure will be described in more details with reference to the drawings. Although the drawings illustrate example embodiments of the present disclosure, it should be appreciated that the present disclosure can be implemented in various manners and should not be limited to the embodiments explained herein. On the contrary, embodiments are provided to make the present disclosure more thorough and complete and to fully convey the scope of the present disclosure to those skilled in the art.

As used herein, the term "comprises" and its variants are to be read as open-ended terms that mean "comprises, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can include other explicit and implicit definitions.

The term "rehydrate" used herein refers to reading a file from a storage device so as to fully rebuild the file.

Figure 1:
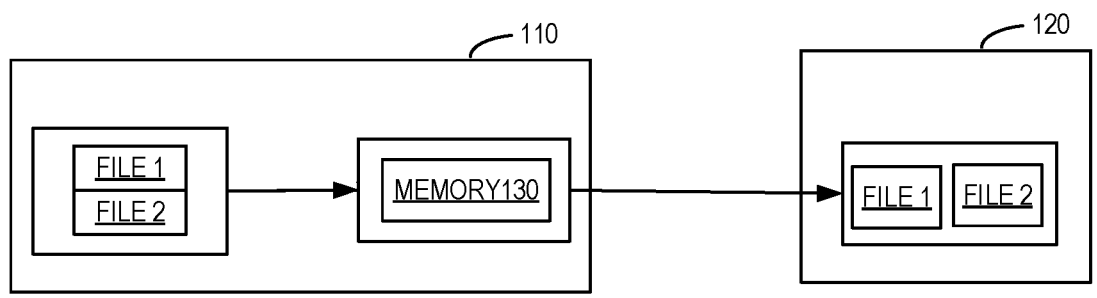
FIG. 1 illustrates a schematic block diagram of storage system architecture in conventional technologies.

As described above, different backup systems have different backup data structures, so it is usually required to rehydrate all backup data and dump it to a memory and transmit the data to a new backup system. For example, as shown in FIG. 1, if a file 1010 and a file 1020 on a machine 110 are migrated to a machine 120, it is required that the file 1010 and the file 1020 are first rehydrated in the memory 130 and then migrated to the machine 120. In other words, the file is migrated as a whole.

In order to improve data moving performance, it is often expected to filter out data which has already been backup in the new backup system. In conventional technologies, the file data can be filtered out as a whole. Although the file data is stored in units of data chunks, it lacks an effective backup solution at the data chunk level currently. This is because: 1. different backup systems have different algorithms to divide the file into data chunks; thus, the data chunks among different backup systems cannot be compared; 2. different backup systems may never expose their data chunk information to the outside through design because it is not safe to expose the data chunk information to the outside, which may increase the risk for data leakage.

Figure 2:
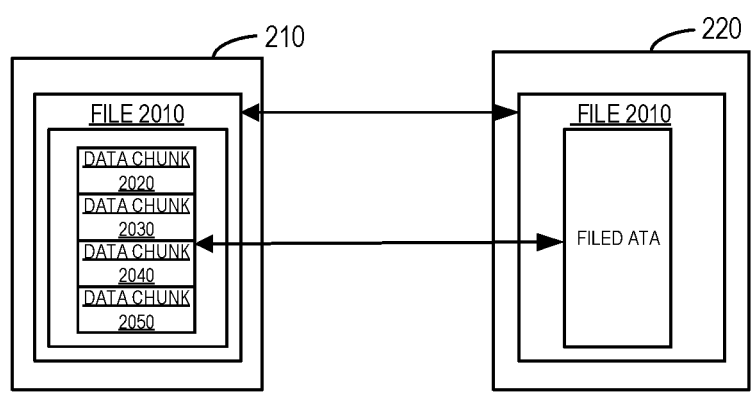
FIG. 2 illustrates a schematic block diagram of storage system architecture in conventional technologies.

As shown in FIG. 2, if a file 2010 is migrated from the machine 210 to the machine 220, it is checked whether the file 2010 has already existed in the machine 220 by comparing file attributes only, for example, comparing file names, file paths, file modification time, file sizes and so on. However, it cannot be determined whether data chunks 2020, 2030, 2040 and 2050 included in the file 2010 have already existed in the machine 220.

Figure 3:
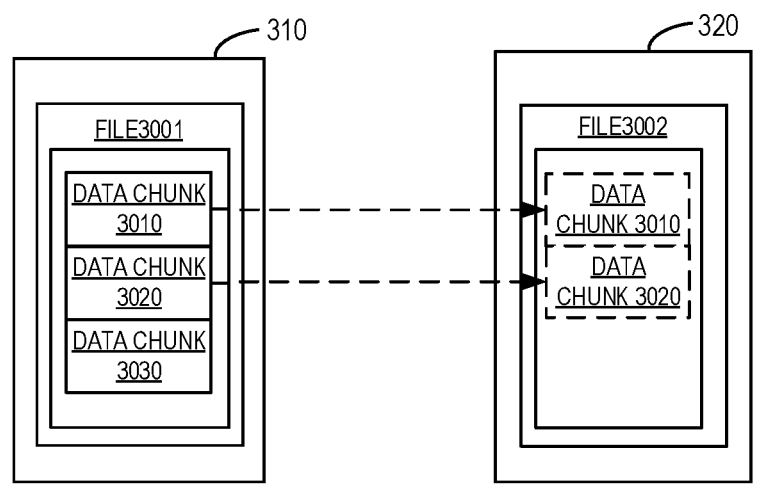
FIG. 3 illustrates a schematic block diagram of storage system architecture in conventional technologies.

However, if only a part of the file data is different, it may still be required to rehydrate and transmit the already existed part of the file data to a new machine and/or backup system. As shown in FIG. 3, the file 3002 differs from the file 3001, but only the data from the data chunk 3030 is actually different. However, it is still required to rehydrate the data chunks 3010 and 3020 and transmit them from the machine 310 to the machine 320. In fact, the data of the data chunks 3010 and 3020 actually exist in the machine 320, so it is redundant to transmit data chunks 3010 and 3020. Since the conventional technologies only compare at the file level rather than the data chunk level, it is impossible to determine whether the data chunk exists in the new machine. As described above, the conventional technologies can perform comparisons at the file level only. Hence, it is required to propose a new solution to realize more effective data migration.

Figure 4:
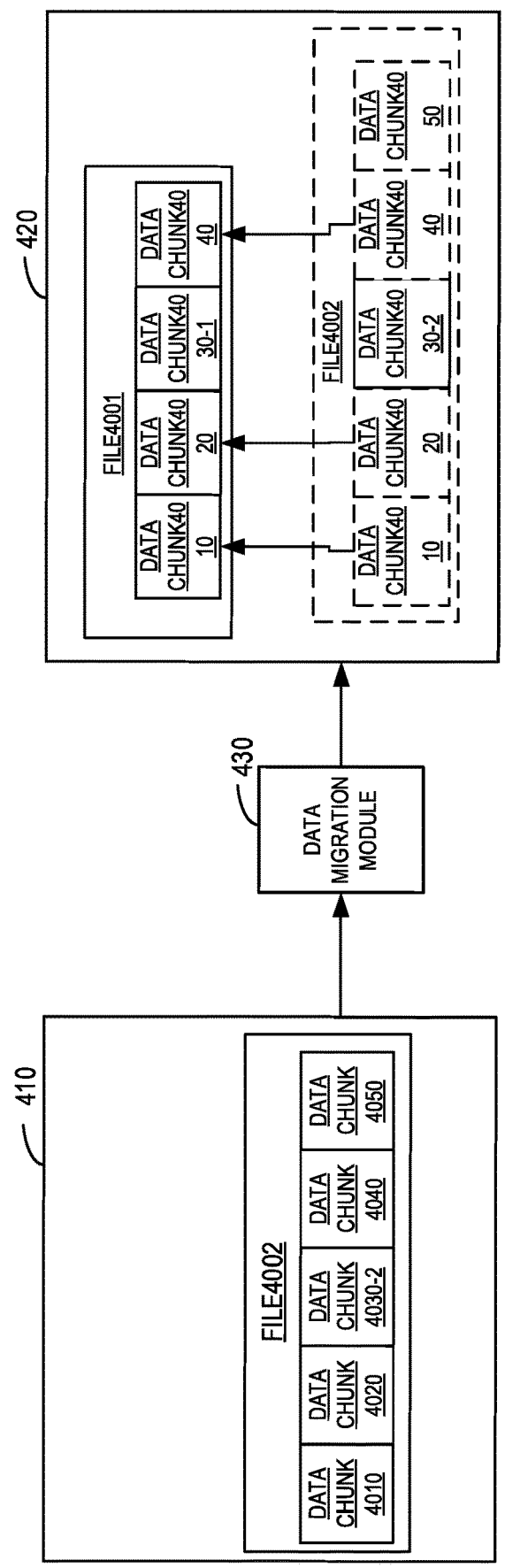
FIG. 4 illustrates a schematic block diagram of storage system architecture in accordance with embodiments of the present disclosure.

FIG. 4 illustrates a schematic block diagram of architecture of a storage system in accordance with embodiments of the present disclosure. As shown in FIG. 4, a file 4002 is migrated from a machine 410 to a machine 420 via a data migration module 430. The file 4002 comprises data chunks 4010, 4020, 4030, 4030-2, 4040 and 4050. The file 4001 has already been stored in the machine 420 and comprises data chunks 4010, 4020, 4030, 4030-1 and 4040. It should be noted that the number of files shown in FIG. 4 is only an example, rather than restrictive. In addition, the number of data chunks comprised in the file is also an example rather than restrictive. In some embodiments, the data migration module 430 may be implemented on the machine 410. Alternatively, in a further embodiment, the data migration module 430 may also be implemented on the machine 420.

It should be appreciated that the files can be migrated either from the machine 410 to the machine 420 or from the machine 420 to the machine 410. For the purpose of illustration, embodiments of the present disclosure are described below with reference to the migration from the machine 410 to the machine 420.

The machines 410 and 420 may be any suitable types of machines. For example, the machine 410 may be a server for AVAMAR system while the machine 420 may be a server for DATA DOMAIN. It should be noted that the machines 410 and 420 may also be different types of machines for other various systems. Embodiments of the present disclosure are not restricted in this aspect. Embodiments of the present disclosure will be further explained below with reference to FIG. 4.

According to embodiments of the present disclosure, if the file 4001 is migrated between the machine 410 and the machine 420, the data migration module 430 compares the file 4001 with the files already stored in the machine 420 at the data chunk level, so as to only migrate changed and/or added data chunks in the file 4001 to the machine 420. In this way, the performance of data migration is improved.

Figure 5:
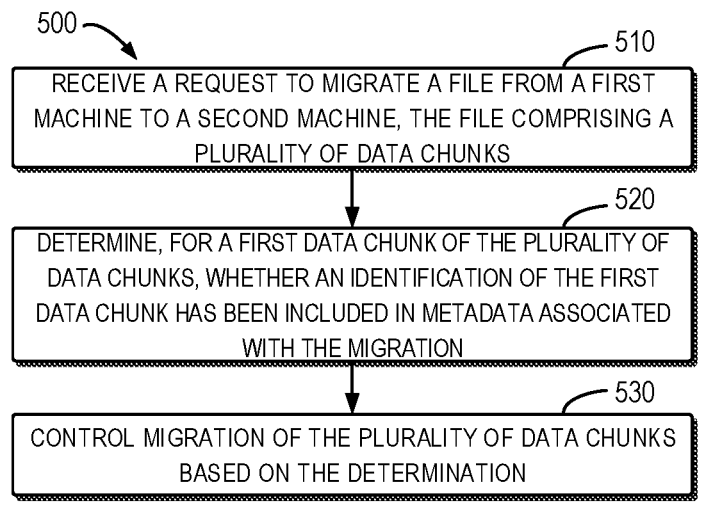
FIG. 5 illustrates a flowchart of a method in accordance with embodiments of the present disclosure.

FIG. 5 illustrates a flowchart of a method 500 in accordance with embodiments of the present disclosure. The method 500 may be implemented in the data migration module 430. As described above, the data migration module 430 may be implemented on either the machine 410 or the machine 420.

At 510, the data migration module 430 receives a request to migrate the file 4002 from the machine 410 to the machine 420. The file 4002 comprises a plurality of data chunks. Only as an example, the file 4002 comprises data chunks 4010, 4020, 4030, 4030-2, 4040 and 4050.

In some embodiments, the data migration module 430 acquires, from the machine 410, information of the data chunks in the file 4002. For example, the information of the data chunks may include one or more of identification of the data chunks, creation time of the data chunks, creators of the data chunks and so on.

At 520, for a first data chunk in the plurality of data chunks, the data migration module 430 determines whether the identification of the first data chunk has been included in metadata associated with the migration. For example, the data migration module 430 can determine whether the identifications of data chunks 4010, 4020, 4030, 4030-2, 4040 and 4050 exist in the metadata, respectively. In some embodiments, the data migration module 430 may acquire, from the machine 410, identifiers of these data chunks. In this way, the comparison at the data chunk level can be achieved, thereby avoid migrating the data chunks which have already existed on the machine 420.

Figure 6:
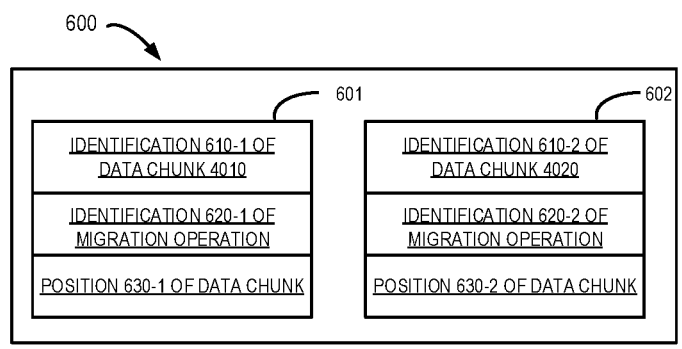
FIG. 6 illustrates a schematic diagram of data structure in accordance with embodiments of the present disclosure.

FIG. 6 illustrates a schematic diagram of data structure of the metadata 600 in accordance with embodiments of the present disclosure. It should be appreciated that the data structure shown in FIG. 6 is only an example rather than restrictive. The metadata indicates the information of the data chunks which have already been migrated from the machine 410 to the machine 420 previously. As shown in FIG. 6, the metadata includes information 601 of the data chunk 4010 and information 602 of the data chunk 4020. It should be noted that the information of the data chunk shown in FIG. 6 is only an example.

Only as an example, the information 601 of the data chunk 4010 includes an identification 610-1 of the data chunk 4010, an identification 620-1 of a migration operation which previously migrated the data chunk 4010 to the machine 420, and a position 630-1 of the data chunk 4010 in the machine 420. Only as an example, the information 602 of the data chunk 4020 includes an identification 610-2 of the data chunk 4020, an identification 620-2 of a migration operation which previously migrated the data chunk 4020 to the machine 420 and a position 630-2 of the data chunk 4020 in the machine 420. It should be appreciated that the information of the data chunks shown in FIG. 6 is an example and the information of the data chunk may also include other types of information. For example, the data chunk information may also comprise creation time, creators of the data chunk and the like.

In some embodiments, the identification of the data chunk may be a hash value of the data chunk. In other embodiments, the identification of the data chunk may be a further value which can represent the data chunk. In certain embodiments, the identification of migration operation may be a timestamp associated with the migration operation. For example, the migration operation identification may be a timestamp indicating the time when the migration operation is created on the machine 410. The migration operation identification may also be, for example, a numeric value generated based on the migration operation and the like.

Figure 7:
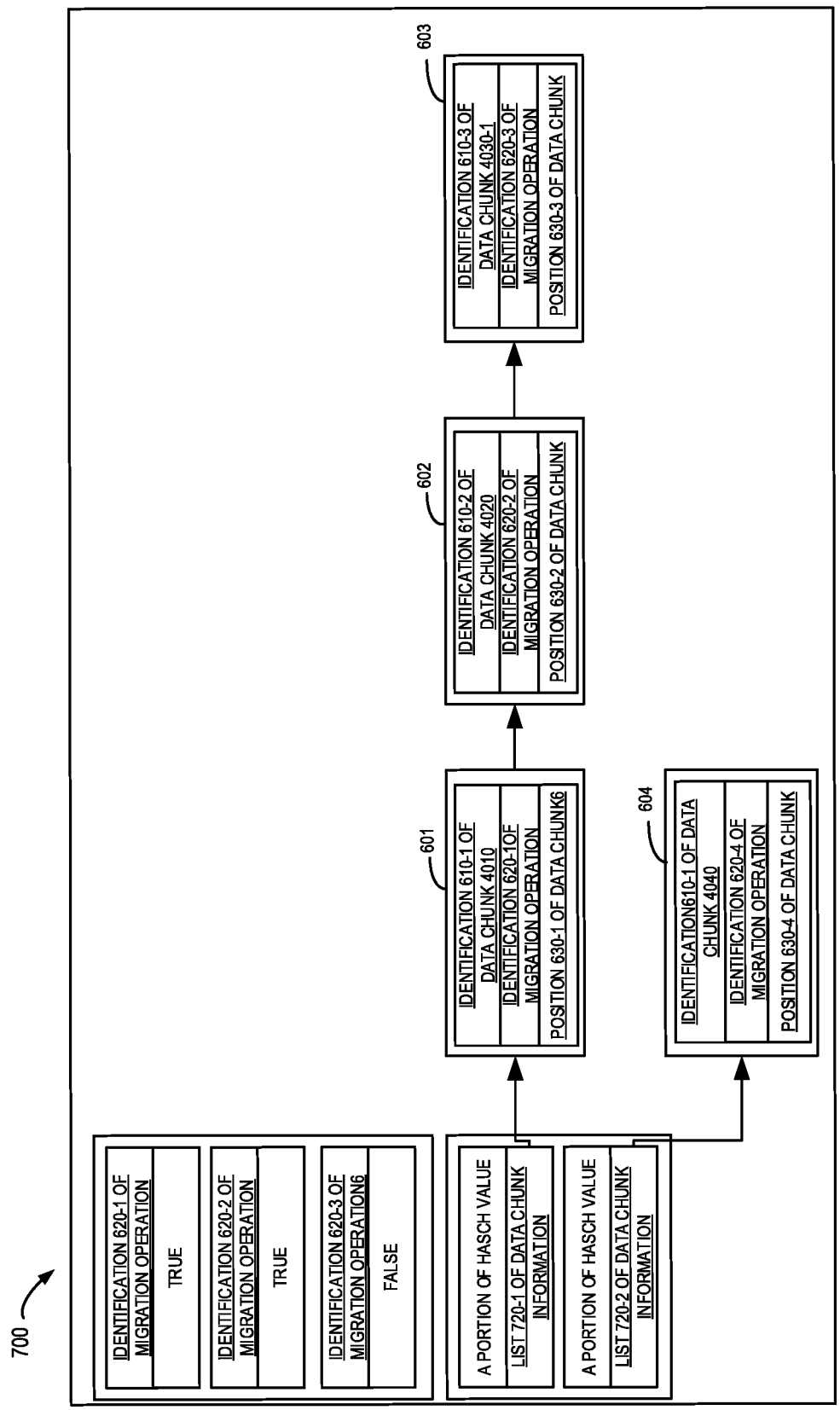
FIG. 7 illustrates a schematic diagram of data structure in accordance with embodiments of the present disclosure.

In some embodiments, the metadata may comprise information of a data chunk recently migrated to the machine 420. The metadata may also determine whether a data chunk which is previously migrated to the machine 420 is available. FIG. 7 illustrates a schematic diagram of a data structure 700 of the metadata in accordance with embodiments of the present disclosure. As shown in FIG. 7, the metadata comprises an identification of the migration operation and information indicating whether the migration operation is available. In some embodiments, each time when a data migration (such as, data backup) is performed, the data migration module 430 may select an empty item or the oldest item in a header to record the identification of the migration operation. The indication of the migration operation may also be updated in the data chunk information. When the data migration operation is completed, a validity tag of the identification of the migration operation in the header is marked as true.

In some embodiments, the data migration module 430 may transmit the identification of the migration operation to the machine 420 to determine whether the data chunks related to the migration operation still exist in the machine 420. The machine 420 returns to the data migration module a result with respect to whether the data chunks related to the migration operation are deleted or not. The data migration module 430 determines whether the migration operation is available based on the result returned by the machine 420. As shown in FIG. 7, the migration operation identifications 620-1 and 620-2 are available while the migration operation identification 620-3 is unavailable. In some embodiments, the machine 420 may also lock data chunks associated with the migration operation inquired by the data migration module 430, so as to avoid deleting these data chunks during the current migration operation.

Now referring back to FIG. 5, at 530, the data migration module 430 controls the migration of the data chunks based on the determination. For example, if the data migration module 430 determines a presence of a data chunk in the machine 420, the data migration module 430 will not migrate this data chunk.

Figure 8:
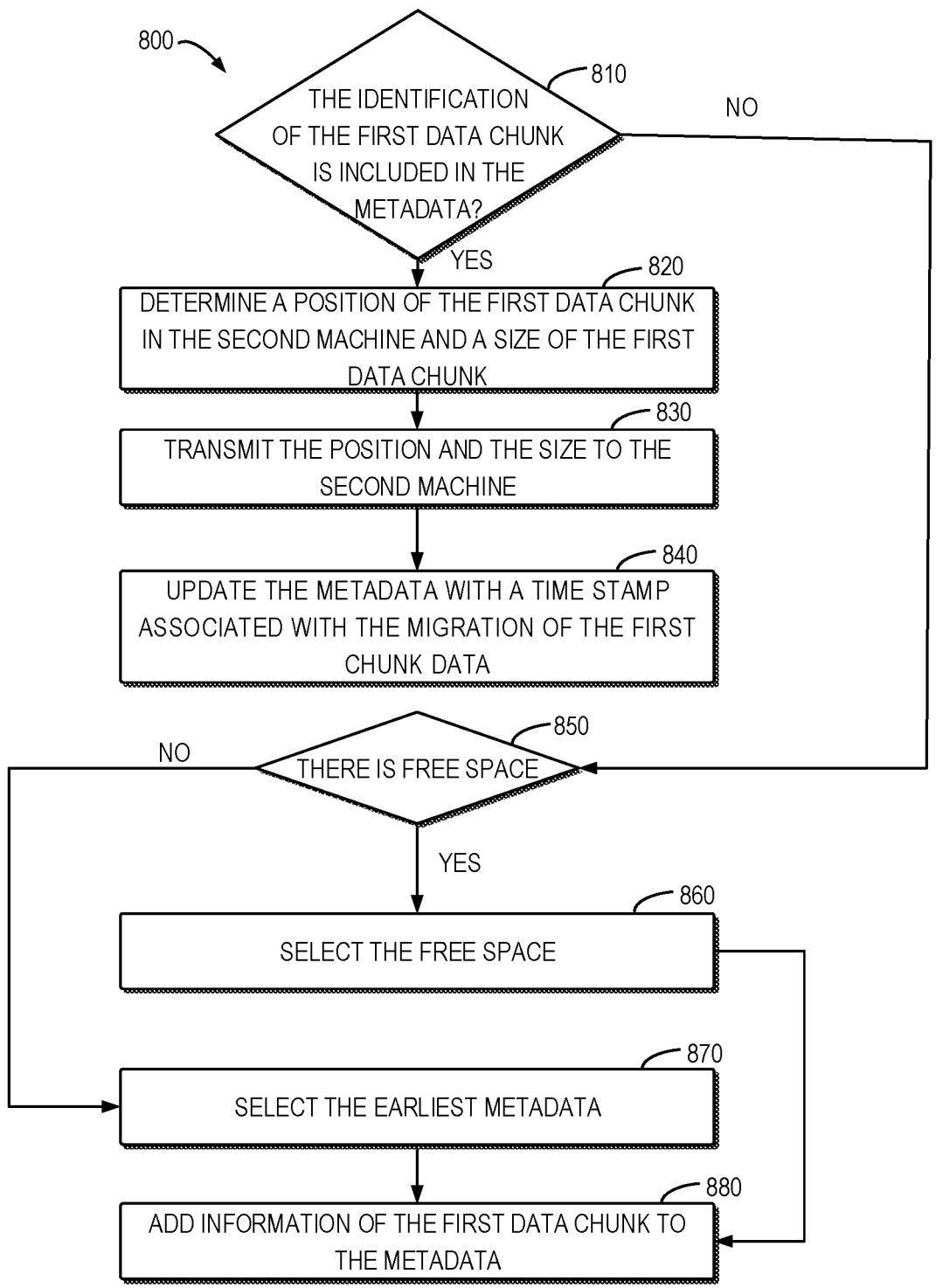
FIG. 8 illustrates a flowchart of a method in accordance with embodiments of the present disclosure.

FIG. 8 illustrates a flowchart of a method 800 in accordance with some embodiments of the present disclosure. It should be appreciated that the method 800 is only an example procedure of data migration rather than being restrictive. At 810, the data migration module 430 determines whether the data chunk is included in the metadata. For example, the data migration module 430 may determine whether the identification 610-1 of the data chunk 4010 exists in the metadata.

In some embodiments, the identification may be a hash value of the data chunk as described above. The data migration module 430 may determine whether the data chunk 4010 exists in the metadata based on a part of hash value of the data chunk 4010. As shown in FIG. 7, the data chunks can be divided, in the metadata, into groups based on a portion of hash values of the data chunks. For example, the data chunks can be divided into groups in accordance with the last four bits of the hash values of the data chunks. Only as an example, the last four bits of the hash values of the data chunks 4010, 4020 and 4030-1 are identical. Therefore, the data chunks 4010, 4020 and 4030-1 can be regarded as one group. The information 601 of the data chunk 4010, the information 602 of the data chunk 4020 and the information 603 of the data chunk 4030-1 are stored into a list 720-1 of data chunk information. Because the last four bits of the hash values of the data chunks 4040 are different from other data chunks, the information 604 of the data chunk 4040 is stored in a list 720-2 of data chunk information.

In an example embodiment, the data migration module 430 acquires a portion of the identification 610-1 of the data chunk 4010 and determines, based on this portion, that the information of the data chunk 4010 is stored in the list 720-1 of data chunk information. The data migration module 430 can compare the identification 610-1 of the data chunk 4010 with the hash value in the list 720-1 of data chunk information to determine presence of the data chunk 4010 in the metadata.

If the data migration module 430 determines that the data chunk exists in the metadata, the data migration module 430 may determine a position of the data chunk in the machine 420 and the size of the data chunk at 820. For example, the data migration module 430 may determine, based on the information of the data chunk 4010, the position of the data chunk 4010 in the machine 420 and the size of the data chunk 4010.

At 830, the data migration module 430 may transmit the position and the size to the machine 420 without migrating the data chunk. The machine 420 may make a reference to the position for this data migration operation. In some embodiments, at 840, the data migration module 430 can update the metadata associated with the data chunk with the timestamp related to the migration of the data chunk.

In some embodiments, if the data migration module 430 determines that addresses of the adjacent data chunks are contiguous, the data migration module 430 may transmit to the machine 420 the address of the former data chunk and the sum of sizes of the two data chunks. For example, the data migration module 430 may firstly determine the presence of the data chunk 4010 in the machine 420. The data migration module 430 continues to determine whether the subsequent data chunk 4020 is in the machine 420 instead of transmitting related information to the machine 420. If the data migration module 430 determines that the data chunk 4020 is in the machine 420 while the data chunk 4030 is not, the data migration module 430 further determines that the addresses of the data chunks 4010 and 4020 are contiguous in the machine 420. The data migration module 430 may transmit to the machine 420 a start address of the data chunk 4010 and an end address of the data chunk 4020 or a start address of the data chunk 4010 and a sum of the sizes of the two data chunks. In this way, excessive message transmission between the machines can be effectively avoided.

In some embodiments, if the data migration module 430 determines that the data chunk is not in the metadata, the data migration module 430 may migrate the data chunk. For example, the data chunk 4030-2 is a modified data chunk different from the data chunk 4030-1 and the data chunk 4050 is a new data chunk, the data migration module 430 needs to migrate the data chunks 4030-2 and 4050 to the machine 420.

In some embodiments, the data migration module 430 rehydrates the data chunk 4030-2 to restore it to the original data or data which is recognizable by the machine 420. The data migration module 430 migrates the restored data to the machine 420.

In some embodiments, the data migration module 430 adds the information of the data chunk into the metadata. For example, the data migration module 430 needs to add the information of the data chunks 4030-2 and 4050 to the metadata.

At 850, the data migration module 430 may determine whether storage space of the metadata is free. If the storage space is free, the data migration module 430 chooses the free space to add the information of the data chunk at 860. For example, the data migration module 430 may add the identification of the data chunk 4030-2, the identification of the data migration operation and the position of the data chunk 4030-2 in the machine 420 to the free storage space.

If there is no free space, the data migration module 430 selects, at 870, the metadata with the earliest timestamp of migration operation. At 880, the data migration module 430 overwrites the data chunk information on the metadata. For example, if the migration operation identification 620-4 of the information 604 of the data chunk 4040 indicates an earliest migration operation time, the data migration module 430 overwrites the information of the data chunk 4030-2 on the storage space where the information 604 of the data chunk 4040 is located. In this way, it can be determined that the metadata includes the information of the data chunks involved in the latest data migration operation, thereby improving the hit probability.

Figure 9:
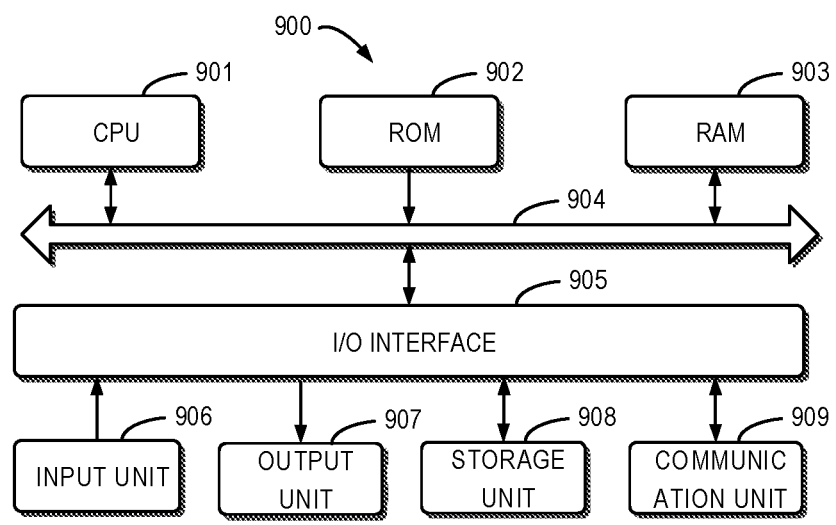
FIG. 9 illustrates a schematic block diagram of a device suitable for implementing embodiments of the present disclosure.

FIG. 9 illustrates a schematic block diagram of an electronic device 900 suitable for implementing embodiments of the present disclosure. As shown, the device 900 includes a central process unit (CPU) 901, which can execute various suitable actions and processing based on the computer program instructions stored in a read-only memory (ROM) 902 or computer program instructions loaded in a random-access memory (RAM) 903 from a storage unit 908. The RAM 903 can also store all kinds of programs and data required by the operations of the device 900. The CPU 901, ROM 902 and RAM 903 are connected to each other via a bus 904. An input/output (I/O) interface 905 is also connected to the bus 904.

A plurality of components in the device 900 is connected to the I/O interface 905, including: an input unit 906, such as keyboard, mouse and the like; an output unit 907, for example, various kinds of display and loudspeakers and the like; a storage unit 908, such as disk and optical disk and the like; and a communication unit 909, such as network card, modem, wireless transceiver and the like. The communication unit 909 allows the device 900 to exchange information/data with other devices via the computer network, such as Internet, and/or various telecommunication networks.

The above described each method or procedure, such as the procedure 500 and/or procedure 800, can be executed by the processing unit 901. For example, in some embodiments, the procedure 500 and/or procedure 800 can be implemented as a computer software program tangibly included in the machine-readable medium, for example, the storage unit 908. In some embodiments, the computer program can be partially or fully loaded and/or mounted to the device 900 via the ROM 902 and/or the communication unit 909. When the computer program is loaded to the RAM 903 and executed by the CPU 901, one or more actions of the above described the procedure 500 and/or procedure 800 can be implemented. Alternatively, the CPU 901 also can be configured to implement the above procedure in any other appropriate ways.

Based on the above description, it can be observed that the solution of the present disclosure is suitable for the following applications: in accordance with embodiments of the present disclosure, if a file is migrated between the first machine and the second machine, the data migration module compares the file with the files already stored in the second machine at the data chunk level, so as to migrate the modified and/or changed data chunks in the file into the second machine. Accordingly, the performance of data migration has been improved.

The present disclosure can be method, apparatus, system and/or computer program product. The computer program product can include a computer-readable storage medium, on which the computer-readable program instructions for executing various aspects of the present disclosure are loaded.

The computer-readable storage medium can be a tangible device that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

Computer readable program instructions described herein can be downloaded to respective computing/processing devices from a computer readable storage medium, or downloaded to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, by means of state information of the computer readable program instructions, an electronic circuitry including, for example, programmable logic circuitry, field-programmable gate arrays (FPGA), or programmable logic arrays (PLA) can be personalized to execute the computer readable program instructions, thereby implementing various aspects of the present disclosure.

Aspects of the present disclosure are described herein with reference to flowchart and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which are executed on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of codes, which comprises one or more executable instructions for implementing the specified logical function(s). In some alternative implementations, the functions noted in the block may be implemented in an order different from those illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

The descriptions of the various embodiments of the present disclosure have been presented for illustration purposes, but are not intended to be exhaustive or limited to the embodiments disclosed. Many modifications and variations will be apparent to those of skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A computer-implemented method, comprising:
receiving a request to migrate a file from a first machine to a second machine, the file comprising a plurality of data chunks;
determining, for a first data chunk of the plurality of data chunks, whether an identification of the first data chunk has been included in metadata associated with the migration, the metadata indicating information of a data chunk which has been previously migrated from the first machine to the second machine;
in response to determining that the identification of the first data chunk is included in the metadata, determining a first position of the first data chunk in the second machine without migrating the first data chunk; and
controlling migration of the plurality of data chunks based on the determination and the first position of the first data chunk.

2. The method of claim 1, wherein controlling migration of the data chunks based on the determination comprises:
in response to determining that the identification of the first data chunk fails to be included in the metadata, migrating the first data chunk to the second machine; and
adding information of the first data chunk into the metadata.

3. The method of claim 1, wherein controlling migration of the data chunk based on the determination comprises:
in response to determining that the identification of the first data chunk is included in the metadata, determining a size of the first data chunk without migrating the first data chunk; and
transmitting, to the second machine, an indication of the first position and the size of the first data chunk.

4. The method of claim 3, further comprising:
updating the metadata with a timestamp associated with the migration of the first data chunk.

5. The method of claim 3, further comprising:
in response to determining that an identification of a second data chunk has been included in metadata associated with the migration, determining a second position of the second data chunk in the second machine and a size of the second data chunk;

determining, based on the first position, the second position and the size of the second data chunk, whether the first and the second data chunks are contiguous;

in response to determining that the first and the second data chunks are contiguous, transmitting, to the second machine, an indication of the second position and a sum of sizes of the first and the second data chunks.

6. The method of claim 1, wherein the identification is a hash value of the first data chunk, wherein determining whether the identification of the first data chunk has been included in metadata associated with the migration comprises:

acquiring portions of a plurality of hash values of a further plurality of data chunks in the metadata;

dividing the metadata into a plurality of subsets based on the acquired portions of the further plurality of hash values;

acquiring a portion of the hash value of the first data chunk;

selecting a target subset from the plurality of subsets based on a portion of the identification;

comparing the identification with hash values of data chunks in the target subset; and in response to a data chunk matching with the identification being in the target subset, determining whether the identification of the first data chunk has been included in metadata associated with the migration.

7. An electronic device, comprising:

at least one processing unit; and at least memory coupled to the at least one processing unit and storing machine-executable instructions, the instructions, when implemented by the at least one processing unit, causing the device to perform acts, comprising:

receiving a request to migrate a file from a first machine to a second machine, the file comprising a plurality of data chunks;

determining, for a first data chunk of the plurality of data chunks, whether an identification of the first data chunk has been included in metadata associated with the migration, the metadata indicating information of a data chunk which has been previously migrated from the first machine to the second machine;

in response to determining that the identification of the first data chunk is included in the metadata, determining a first position of the first data chunk in the second machine without migrating the first data chunk; and controlling migration of the plurality of data chunks based on the determination and the first position of the first data chunk.

8. The electronic device of claim 7, wherein controlling migration of the data chunk based on the determination comprises:

in response to determining that the identification of the first data chunk fails to be included in the metadata, migrating the first data chunk to the second machine; and adding information of the first data chunk into the metadata.

9. The electronic device of claim 7, wherein controlling migration of the data chunk based on the determination comprises:

in response to determining that the identification of the first data chunk is included in the metadata, determining a size of the first data chunk without migrating the first data chunk; and transmitting, to the second machine, an indication of the first position and the size of the first data chunk.

10. The electronic device of claim 9, wherein the actions include:

updating the metadata with a timestamp associated with the migration of the first data chunk.

11. The electronic device of claim 9, wherein the actions further include:

in response to determining that an identification of a second data chunk has been included in metadata associated with the migration, determining a second position of the second data chunk in the second machine and a size of the second data chunk;

determining, based on the first position, the second position and the size of the second data chunk, whether the first and the second data chunks are contiguous;

in response to determining that the first and the second data chunks are contiguous, transmitting, to the second machine, an indication of the second position and a sum of sizes of the first and the second data chunks.

12. The electronic device of claim 7, wherein the identification is a hash value of the first data chunk, wherein determining whether the identification of the first data chunk has been included in metadata associated with the migration comprises:

acquiring portions of a plurality of hash values of a further plurality of data chunks in the metadata;

dividing the metadata into a plurality of subsets based on the acquired portions of the further plurality of hash values;

acquiring a portion of the hash value of the first data chunk;

selecting a target subset from the plurality of subsets based on a portion of the identification;

comparing the identification with hash values of data chunks in the target subset; and in response to a data chunk matching with the identification being in the target subset, determining whether the identification of the first data chunk has been included in metadata associated with the migration.

13. A computer program product, tangibly stored on a non-transitory computer-readable medium and including machine executable instructions, the machine-executable instructions, when executed, causing a machine to:

receive a request to migrate a file from a first machine to a second machine, the file comprising a plurality of data chunks;

determine, for a first data chunk of the plurality of data chunks, whether an identification of the first data chunk has been included in metadata associated with the migration, the metadata indicating information of a data chunk which has been previously migrated from the first machine to the second machine; and in response to determining that the identification of the first data chunk is included in the metadata, determining a first position of the first data chunk in the second machine without migrating the first data chunk; and control migration of the plurality of data chunks based on the determination and the first position of the first data chunk.

14. The computer program product of claim 13, wherein controlling migration of the data chunks based on the determination comprises:

in response to determining that the identification of the first data chunk fails to be included in the metadata, migrating the first data chunk to the second machine; and adding information of the first data chunk into the metadata.

15. The computer program product of claim 13, wherein controlling migration of the data chunk based on the determination comprises:

in response to determining that the identification of the first data chunk is included in the metadata, determining a size of the first data chunk without migrating the first data chunk; and transmitting, to the second machine, an indication of the position and the size of the first data chunk.

16. The computer program product of claim 15, wherein the machine-executable instructions, when executed, cause a machine to:

update the metadata with a timestamp associated with the migration of the first data chunk.

17. The computer program product of claim 15, wherein the machine-executable instructions, when executed, cause a machine to:

in response to determining that an identification of a second data chunk has been included in metadata associated with the migration, determine a second position of the second data chunk in the second machine and a size of the second data chunk;

determine, based on the first position, the second position and the size of the second data chunk, whether the first and the second data chunks are contiguous;

in response to determining that the first and the second data chunks are contiguous, transmitting, to the second machine, an indication of the second position and a sum of sizes of the first and the second data chunks.

18. The computer program product of claim 13, wherein the identification is a hash value of the first data chunk, wherein determining whether the identification of the first data chunk has been included in metadata associated with the migration comprises:

acquiring portions of a plurality of hash values of a further plurality of data chunks in the metadata;

dividing the metadata into a plurality of subsets based on the acquired portions of the further plurality of hash values;

acquiring a portion of the hash value of the first data chunk;

selecting a target subset from the plurality of subsets based on a portion of the identification;

comparing the identification with hash values of data chunks in the target subset; and in response to a data chunk matching with the identification being in the target subset, determining whether the identification of the first data chunk has been included in metadata associated with the migration.

* * * * *